United States Patent [19]

Howeth

[11] Patent Number: 4,544,389
[45] Date of Patent: Oct. 1, 1985

[54] MULTIPLE JET BACKFLUSHED AIR FILTER

[76] Inventor: D. Franklin Howeth, 233 Chuck Wagon Trail, Fort Worth, Tex. 76108

[21] Appl. No.: 549,963

[22] Filed: Nov. 7, 1983

[51] Int. Cl.⁴ ............................................. B01D 46/04
[52] U.S. Cl. .......................................... 55/302; 55/293
[58] Field of Search ............................ 55/96, 293, 302

[56] References Cited

U.S. PATENT DOCUMENTS

| | | | |
|---|---|---|---|
| 3,874,857 | 4/1975 | Hunt et al. | 55/302 |
| 4,209,310 | 6/1980 | Berkhoel | 55/273 |
| 4,214,882 | 7/1980 | Brenholt | 55/302 |
| 4,319,897 | 3/1982 | Labadie | 55/302 |
| 4,357,151 | 11/1982 | Helfritch et al. | 55/302 |
| 4,388,087 | 6/1983 | Tipton | 55/302 |

FOREIGN PATENT DOCUMENTS 1657124 1/1970 Fed. Rep. of Germany ........ 55/302

OTHER PUBLICATIONS

Supersonic Injector Nozzles Clean Filter Bags Effectively; Brian J. Hogan; Design News; 7/18/83; pp. 96–97.

Primary Examiner—David L. Lacey
Attorney, Agent, or Firm—Hubbard, Thurman, Turner & Tucker

[57] ABSTRACT

A reverse air jet cleaning system for impingement or porous media type air filter elements includes one or more specifically shaped cleaning air manifolds or heads in which a plurality of jet nozzles or orifices are arranged in a predetermined pattern to provide a totally enveloping air jet which is discharged into a flow tube immediately downstream of the clean air flow chamber of a generally tubular filter element. The jet pattern provides a temporary pressure seal within the flow tube and entrains a substantial amount of ambient air into the reverse flow jet to thoroughly flush or flood the filter element to clean the dust cake from the exterior surface of the element. The multiple jet arrangement reduces the overall space occupied by the reverse jet cleaning system and provides a larger mass flow of cleaning air to thoroughly flush the surfaces of the filter element. The multiple jet orifice heads or manifolds may be configured in virtually any geometric shape to provide the desired jet pattern and are not limited to use in conjunction with cylindrical tubular type filter elements.

17 Claims, 8 Drawing Figures

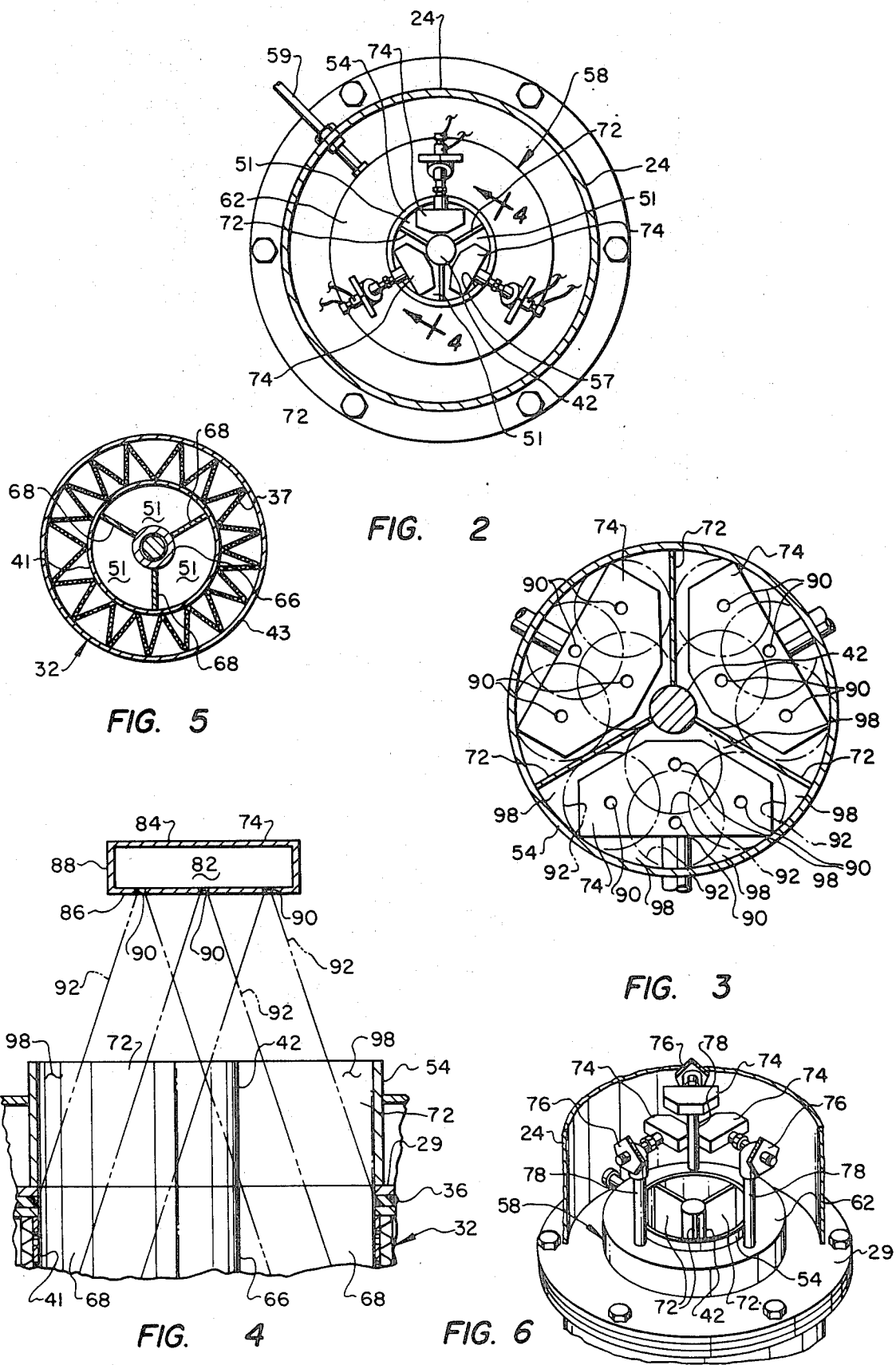

MULTIPLE JET BACKFLUSHED AIR FILTER

BACKGROUND OF THE INVENTION

1. Field of the Invention

The present invention pertains to a porous media type air filter unit having a multiple jet reverse flow cleaning system for the filter element wherein a substantial volume of jet cleaning air and entrained ambient air are used to flush the filter element to remove accumulated dust particles.

2. Background

In the art of impingement or porous media barrier type air filters, systems have been developed for removing accumulated dust or "cake" from the surface of the filter element by jetting a pulse of pressure air from the clean air or downstream side of the filter element to shock the dust from the element surface. The configuration of conventional filter elements, being a substantially cylindrical annular pleated paper or cloth bag type structure, has resulted in the evolution of a reverse flow cleaning system wherein a jet nozzle is disposed at one end of the filter element somewhat downstream of the inner clean air chamber defined by the element and aimed in the opposite direction to that of the clean air flow out of the element itself. The jet nozzle is typically connected to a source of pressure air through a timer controlled valve wherein, periodically, a short burst or pulse of pressure air is discharged through the nozzle to create a pressure wave which flows through the filter element in reverse direction to remove the dust which has accumulated on the surface of the element itself.

The conventional design of reverse flow cleaning systems relies on the concept of delivering a relatively high pressure pulse of pressure air in the range of 80-100 psig and of very short duration on the order of a few milliseconds, or less, to create a pressure wave. This brief pulse of air is of such short duration that the air jet cannot adequately entrain ambient air surrounding the jet in order to deliver a substantial quantity of reverse flow air to thoroughly flush the filter element clean instead of removing only some of the dust free by the short pulse or pressure wave. Thus, for the amount of energy expended in the high pressure pulse type reverse flow cleaning systems a relatively inefficient process is carried out and the pressure wave unduly stresses the filter media. In order to overcome the problems with prior art systems certain types of barrier filter elements such as the porous media pleated paper type have been grossly derated as to their filtering capacity to prevent early filter element deterioration and failure due to the reverse pulse jet action. One prior art type of filter cleaning system using porous media elements requires derating of the element for most applications to a maxima capacity of 2-3 cubic feet per minute of filter air flow per square foot of filter surface area.

Another problem associated with prior art type reverse flow filter cleaning systems is the amount of space occupied by the reverse flow jet nozzle and associated structure, particularly as the size of the filter element itself increases. Since the cabinet structure around the filter element and the element itself are desirably kept at a minimum size for a given filtering capacity, prior art pulse type air jet cleaning systems have occupied a disproportionately large amount of space in the filter cabinet structure which is not used to any other advantage. The capabilities of prior art reverse jet filter cleaning apparatus has also limited the filter flow area for a given filtering capacity and the flow area of the clean air discharge conduit or flow tube associated with the filter element. Moreover, known types of reverse jet filter cleaning systems have been confined to use with filter elements which are substantially cylindrical tubular structures since the pulse delivered by a single jet nozzle will not conform to the shape of an irregular or noncircular filter cross-sectional shape and produce effective cleaning of the entire filter surface.

The aforementioned problems in the art of reverse jet cleaning systems for air filters, together with the recognition of the need to provide a filter structure which has a maximum filtered air flow area, provides for a minimum filtered air pressure drop for a given filtering requirement, and a more thorough reverse flow cleaning system which will minimize stress on the filter media, has led to the pursuit of a system which will produce relatively large volumes of low pressure air flow through the filtering medium in a reverse direction to completely flush the filter element itself. A system which meets these objectives and overcomes several problems in the art is provided by the present invention.

SUMMARY OF THE INVENTION

The present invention provides an improved reverse flow air jet cleaning system for backflushing an impingement or porous media barrier type filter element.

In accordance with one aspect of the present invention there is provided a reverse air flow cleaning system in combination with a porous media air filter unit wherein a plurality of air jet nozzles or orifices are arranged in a configuration which will provide a reverse flow jet which is in substantial engagement with the peripheral wall of a flow tube downstream of the filter element to create a pressure seal and to entrain a relatively large quantity of ambient air to provide a thorough flushing action to clean accumulated dust and other debris adhering to or caked on the surface of the filter element itself.

In accordance with another aspect of the present invention there is provided a reverse flow cleaning system wherein an arrangement of jet nozzles or orifices is provided in a head or manifold housing in a pattern which will substantially totally envelop the cross-sectional flow area of an irregularly shaped conduit or conduit segment which is provided for conducting clean air away from the interior clean air flow chamber of a porous media barrier type filter element. The multiple jet nozzle arrangement is configured to provide a diverging jet flowstream which will entrain a substantial amount of ambient air to flow in the reverse direction through the filter element to thoroughly flush the element as opposed to shocking or pulsing the element structure. This type of action provides for more thorough cleaning of the element surface and reduces the stress induced on the filter element as compared with the relatively intense high pressure shock wave induced by prior art type reverse jet cleaning systems. Accordingly, in the case of the porous pleated paper type elements, for example, the filter capacity can be uprated to a range of at least 4-5 cubic feet of air flow per minute per square foot of filter area and using souces of reverse jet air at substantially lower pressures.

In accordance with another aspect of the present invention there is provided a reverse jet cleaning system for an air filter element which is configured to minimize the space occupied by the reverse jet cleaning system and to provide a filter discharge flow conduit or tube downstream of the filter element which is larger in cross-sectional flow area than provided by prior art structures. The multiple jet reverse flow cleaning system of the present invention also provides for using filter elements which are larger in diameter for a given total filter area than prior art filter elements thereby further reducing some of the exterior dimensions of the filter unit which are desirably minimized.

In accordance with still a further aspect of the present invention a reverse flow cleaning system and associated structure are provided for porous media type filter units wherein a relatively compact reverse jet cleaning air supply manifold is arranged substantially concentrically around the clean air flow tube downstream of the filter element and is in supportive relationship to a plurality of conduits supporting specially shaped cleaning air jet discharge manifolds or housings in which a predetermined pattern of cleaning air jet nozzles or orifices are arranged.

The advantages derived from the present invention include the provision of a filter unit having a relatively large filter area for a given overall dimensional envelope. The improved reverse air jet cleaning system enables the design of a filter unit having a lower filtered air pressure drop through the filter element for a given flow of air or other fluid to be filtered. The improved jet nozzle configuration and its relationship to the air flow structure downstream of the filter element also provides for entraining a larger volume of so called ambient air with the reverse flow jet to more thoroughly flush or flood the filter element which will assure more thorough cleaning of the element. The air flow rate through the filter element may be increased as compared with prior art derated filter elements without decreasing filter element service life. Lower reverse jet air pressures are required thereby reducing energy requirements and stress levels on the filter elements.

The aforementioned aspects of the present invention together with other superior features will be appreciated by those skilled in the art upon reading the detailed description which follows.

BRIEF DESCRIPTION OF THE DRAWING

FIG. 2 is a section view taken substantially from the line 2—2 of FIG. 1;

FIG. 3 is a detail section view on a larger scale and taken from line 3—3 of FIG. 1;

FIG. 4 is a detail section view taken along line 4—4 of FIG. 2;

FIG. 5 is a section view taken along line 5—5 of FIG. 1;

FIG. 6 is a detail perspective view of the reverse jet supply and discharge manifold arrangement;

DESCRIPTION OF THE PREFERRED EMBODIMENTS

Figure 1:
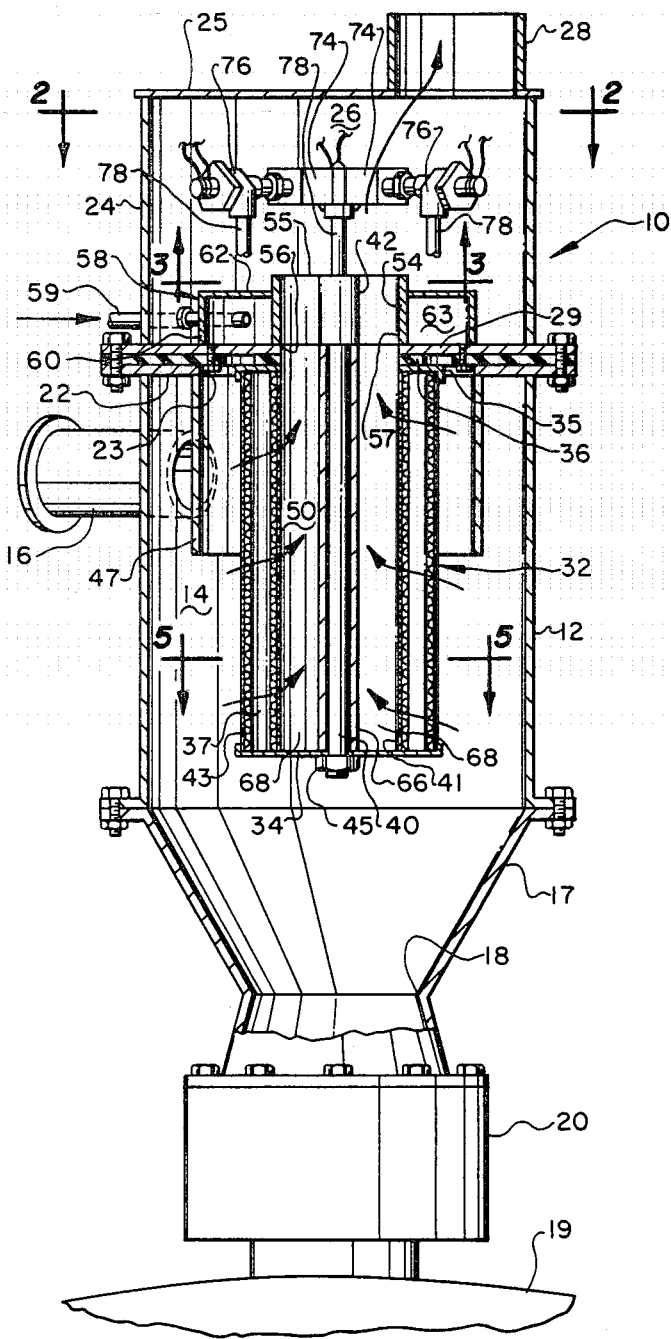
FIG. 1 is a vertical longitudinal section view of an air filter unit including the multiple jet reverse flow cleaning system of the present invention.

In the description which follows like parts are marked throughout the specification and drawing with same reference numerals, respectively. The drawing is not necessarily to scale and certain features of the invention may be shown exaggerated in scale or in somewhat schematic form in the interest of clarity and conciseness.

Referring to FIG. 1, there is illustrated an air filter unit, generally designated by the numeral 10, and including a substantially cylindrical filter housing 12 having an interior chamber 14 into which dust laden air may be introduced by way an inlet conduit 16. The housing 12 includes a lower section 17 having a bottom dust discharge opening 18 which may be in communication to a dust receiver tank 19 by way of a valve device 20 wherein periodically the valve is opened to discharge a quantity of accumulated dust into the tank. The housing 12 also includes a transverse endwall 22 at the opposite end from the dust discharge opening 18 and a clean air discharge housing or shroud 24 suitably mounted on top of and secured to the endwall 22 and forming a clean air discharge chamber 26. The housing 24 includes a top wall 25 which is suitably removable from the remainder of the housing to provide access to the chamber 26. Clean air exiting from the filter unit 10 flows through a clean air discharge conduit 28 to atmosphere or to other suitable conduit means, not shown, depending on the application of the filter unit.

Referring to FIG. 5, also, the filter unit 10 is of a type which utilizes a porous media or so called barrier type filter element, generally designated by the numeral 32. The filter element 32 may be constructed in accordance with one of several known techniques and may, for example, comprise a generally cylindrical tubular pleated paper member 37, or a fabric tube supported by suitable reinforcing structure. The filter element 32 includes a bottom wall 34 and an opposed top wall 35, both of which may be separate from the element itself or form an integral part thereof. The filter element 32 is supported in sealing engagement with a transverse endwall 29 by way of a cylindrical ring type gasket 36 disposed between the top wall 35 and the endwall 29 to form a fluid-tight seal.

The filter element 32 is adapted to be supported within the chamber 14 by suitable means such as, for example, an elongated tie rod 40 integrally formed with a hub part 42 supported on the housing section 24. The rod 40 extends through the bottom wall 34 and is threadedly engaged with a nut 45. The filter element 32 may be installed in the chamber 14 by first removing the housing section 12 from the housing section 17, for example, or by removing the housing section 24 from the housing section 12. The interior chamber 14 is also provided with a dust deflecting shield 47 extending downward from endwall 22 and disposed around an opening 23 in the endwall. The shield 47 is also disposed around an upper portion of the filter element 32 to prevent short circuit flow of dust laden air from the inlet conduit 16 directly into contact with the surface of the filter element. The filter element 32 operates to filter air flowing from the chamber 14 into an interior clean air chamber 50 for exit from the filter unit 10 in accordance with the flow arrows shown in FIG. 1 wherein air flows basically from the chamber 14, through the porous media of the filter element 32, into the chamber 50, then into the chamber 26 and out through the discharge conduit 28.

The filter element 32 functions to remove solid particles from the air flowing through the element by impingement of the particles on the outer surface of the element media. The media for the element 32 is shown as the pleated paper cylinder 37, for example. The paper cylinder 37 is preferably supported by inner and outer cylindrical screenlike members 41 and 43. Dust particles typically accumulate on the exterior surface of the paper cylinder 37 until a substantially solid layer or cake is formed which must be removed to allow the filter element to continue its function and to prevent a pressure differential between the chambers 14 and 50 which might result in the collapse of the filter element. It has been determined that, by providing a momentary reverse flow of relatively high pressure air in a jet or pulse type action, at least some of the accumulated dust may be forcibly removed from the filter element 32 and allowed to fall to the bottom of the housing 12 for discharge through the opening 18.

In accordance with prior art practice the reverse flow jet has been provided by mounting a nozzle substantially coaxial with the longitudinal axis or centerline of the filter element 32 and above, for example, the chamber 50. The aforedescribed prior art nozzle is suitably connected to a source of high pressure air by way of a power operated valve which is momentarily opened and closed to allow a pulse of high pressure air to flow through the chamber 50 and to create a shock wave or pressure spike in an effort to dislodge the aforementioned dust cake and clean the filter element. This prior art type of reverse jet cleaning apparatus requires a relatively constricted filtered air discharge flow tube for conducting clean air from the chamber 50 to the chamber 26 or other discharge conduit means. The aforementioned type of flow tube forms an undesirable flow restriction in the flow path of air being cleaned to thereby dictate higher power requirements for the filtered air in forced flow systems. Moreover, prior art arrangements of reverse flow jet nozzles have also necessitated a relatively large housing part 24 and comparable to the size of the housing section 12 thereby having an overall height which undesirably increases the space occupied by the filter unit.

However, in accordance with the present invention a substantially improved jet nozzle filter element cleaning system has been developed by providing multiple jets of pressure air arranged in such a way as to expand preferably into contact with the peripheral walls of a clean air discharge flow conduit downstream of the chamber 50 in the direction of flow of clean air out of the filter unit. Thanks to the relatively large surface area formed between the multiple jets and the "ambient" air in the chamber 26 the improved jet nozzle configuration provides for entraining a relatively large amount of this ambient air to flow reversely through the chamber 50 and into the chamber 14 to thoroughly flood the filter element 32 and thereby remove substantially all of the dust or accumulated particulate matter on the outer surface of the element.

Referring further to FIGS. 1 and 2, the reverse jet filter cleaning system includes a relatively large diameter flow tube 54 extending from an opening 56 in the endwall 29 vertically upward a relatively short distance to an end face 55. The flow tube 54 is of a diameter such that an inner wall surface or bore 57 forms a passage of approximately the same flow area as the chamber 50 defined by the inner diameter of the filter element 32. The flow tube 54 is surrounded by a cylindrical annular reverse jet air supply manifold 58 including a sidewall 60, a top wall 62, a portion of the endwall 29 and a portion of the flow tube 54 to form an annular manifold chamber 63. Pressure air may be supplied to the manifold 58 by a conduit 59 extending through the outer sidewall of housing 24 as shown in FIG. 2. Referring to FIG. 5, also, the chamber 50 is divided into a plurality of subchambers 51 by a divider structure comprising a central tubular member 66 disposed around the rod 40 and three radially extending partition plates 68 which project outward and are substantially contiguous with the inner member 41 of the filter element 32. The divider structure includes a portion which is formed in the flow tube 54 and includes three circumferentially spaced apart radially projecting partition plates 72, FIG. 3, aligned with the respective plates 68. The plates 72 are suitably joined to and project outward from the hub part 42. The portion of the divider structure comprising the tube 66 and plates 68 may be formed integral with the hub part 42 and plates 72. Although the chamber 50 and the interior of the flow tube 54 are thus divided into three aligned subchambers, those skilled in the art will appreciate from the description herein that the chamber 50 may be divided into fewer or greater numbers of subchambers by a similar type of divider structure.

As shown in FIGS. 1, 2 and 3, the reverse flow filter cleaning system is further characterized by an arrangement of three cleaning air jet discharge heads or manifolds 74 which are disposed directly above the flow chambers 51, respectively, and are each connected to a quick opening high flow rate pilot operated valve 76 for receiving a substantially unrestricted flow of high pressure air from the manifold 58 by way of respective conduits 78. The valves 76 are of a type commercially available and may comprise a model 835633 manufactured by Automatic Switch Co. of Florham Park, N.J., U.S.A. Each of the conduits 78 are substantially rigid conventional pipe or steel tube which are suitably supported on the supply manifold top wall 62, as shown in FIG. 6, and support the respective valves 76 and the manifolds 74 which are mounted in cantilever fashion extending directly above the subchambers 51. The valves 76 are each adapted to be opened and closed in timed relationship to each other by way of a suitable control unit, not shown. Suffice it to say that the aforementioned control unit may be adapted to provide for opening and closing the respective valves 76 in a predetermined sequence for a predetermined duration for allowing high pressure air to flow from the manifold 58 into and through the manifolds 74, respectively.

Referring now to FIGS. 3 and 4, in particular, each of the air discharge manifolds 74 is characterized as a shaped housing having an interior manifold chamber 82 delimited by top and bottom wall 84 and 86 and a peripheral sidewall 88. The bottom wall 86 has a plurality of relatively sharp edged nozzles or orifices 90 formed therein in a predetermined pattern to develop a plurality of overlapping frusto-conical jets, indicated schematically in FIG. 4 and designated by the numerals 92. The specific configuration of the jets 92, comprising a diverging flow of high velocity pressure air, may vary in accordance with the differential pressure between the pressure of the air in the chamber 82 and the chamber 26, the configuration of the nozzles 90 and other principles of fluid mechanics. However, for purposes of description herein the jets 92 are assumed to have fairly well defined conical shapes which extend in overlapping relationship to each other and which diverge until they contact the wall surfaces of the partition plates 72 and the interior wall surface 57 of flow tube 54. The boundaries of the jets 92 which are designated by the conical line are, of course, not quite as sharply defined as indicated in FIG. 4. However, the air flow within the generally conical envelope defining the jets 92 is of very high velocity and therefore tends to entrain the relatively stationary or ambient air outside of the jet boundary. This entrainment adds substantially to the mass of air being directed into the subchambers 51 to flow out through the filter element 32 to remove accumulated dust from the element.

In accordance with an important aspect of the present invention it has been determined that an optimum location of the cleaning air discharge manifolds or heads 74 is such as to produce jets 92 which impinge the interior wall surface of the flow tube 54 and the plates 72 just above or at the juncture of the flow tube with respect to the filter element 32. The point of contact of the jets 92 with the flow tube 54 may be further along the tube toward its discharge end but the air entrainment capability of the jets increases with their placement as shown. In the arrangement illustrated the flow tube 54 actually does not in itself extend to a point contiguous with the filter element 32 but the openings in the endwalls 22 and 29 and the gasket 36 effectively form an extension of the flow tube. For purposes of discussion herein the term downstream as used throughout the specification and claims refers to the direction of normal flow of air to be cleaned through the filter system as previously described. By positioning the manifolds or heads 74 so that the reverse flow cleaning air jets are contiguous with the walls of the flow tube 54 and the plates 72 at or slightly downstream of the juncture of the flow tube with the filter element 32 a "seal" is provided which prevents air from flowing around the periphery of the jets and along the interior sidewalls of the flow tube toward the chamber 26 during discharge of the jets 92.

Moreover, the generally triangular shaped areas 98 formed around the portions of the subchambers 51 delimited by the overlapping jets 92 and the walls of the flow tube 54 and the partition plates 72 increases the area available for entrainment of ambient air with the jetted air to increase the mass flow of cleaning air which is forced to flow reversely through the filter element 32. Those skilled in the art will appreciate that the configuration of the nozzles or orifices 90 and their specific pattern will not necessarily form a precisely defined jet having a cross-sectional area corresponding exactly to the cross-sectional area of the flow path of the jet. However, as the jets 92 diverge into contact with the inner wall surface of flow tube 54 and the surfaces of the plates 72, for example, the configuration of the jets wil be deflected or deformed somewhat as they contact these surfaces so that, at a point just downstream of the juncture of the flow tube 54 with the filter element 32, the air flow throughout the cross-sectional area is virtually totally in a direction opposite to that of the normal flow of air being cleaned through the flow tube.

One important advantage of the multiple jet arrangement for reverse flow cleaning air is that the manifolds or heads 74 may be disposed closer to the top of the flow tube 54 than with prior art single orifice reverse flow air jet systems. Moreover, the provision of multiple reverse flow jets increases the overall surface area or interface between the fast moving jet flow of air and the relatively stationary ambient air to increase the amount of ambient air entrained with the propulsion or jetted air. Another advantage derived from the arrangement described herein is that the flow tube 54 may be made larger in cross-sectional flow area, thereby reducing the pressure drop or resistance to flow of the air being cleaned as it flows through the filter element 32 and from the chamber 50 into the chamber 26. Although it is assumed that the jets 92 diverge in such a way as to form a cone having an included angle of approximately 60°, the configuration of the nozzles or orifices 90 and the pressure differential between the pressure of the cleaning air in the chambers 82 and the pressure in the chamber 26 will determine the specific shape of the jets as they diverge from the respective nozzles.

The operation of the multiple jet reverse flow cleaning system described herein in conjunction with FIGS. 1 through 6 is believed to be readily understandable from the foregoing description. However, briefly, the system is operated by timed opening and closing of the respective valves 76 to emit relatively large volumes of pressure air at pressures in the range of 15 to 60 psig for discharge from the supply manifold 58 into the respective jet discharge manifolds 74. The duration of the open condition of the respective valves 76 is controlled to assure that a substantial flushing or flooding action of the reverse flow cleaning air is carried out as opposed to the quick pulse or shock type action provided by prior art type reverse air flow filter cleaning systems. Moreover, the nominal pressures of the jet cleaning air are preferably 20 to 40 psig which is significantly less than that required by prior art systems.

Figure 7:
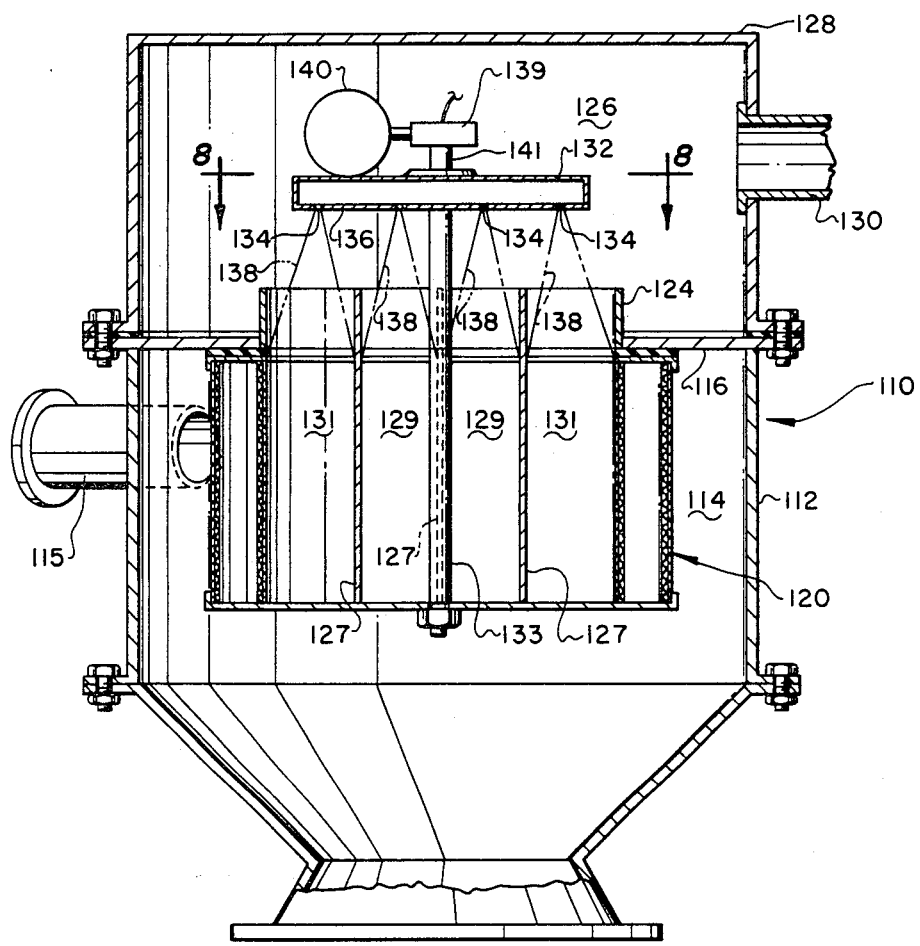
FIG. 7 is a vertical longitudinal central section of an alternate embodiment of multiple jet reverse flow cleaning system and taken along the line 7—7 of FIG. 8.
Figure 8:
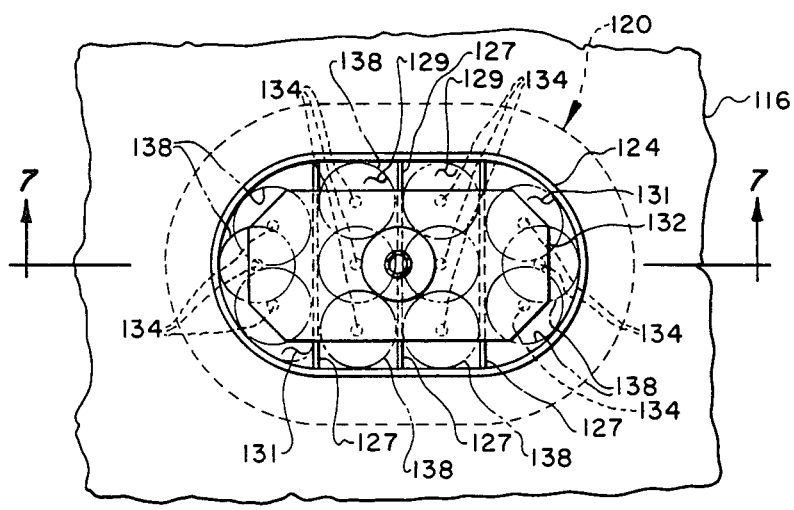
FIG. 8 is a section view taken from the line 8—8 of FIG. 7.

In accordance with another important aspect of the invention provided by the multiple jet discharge manifolds 74, the specific configuration of the filter element and the reverse flow jet itself may be varied. The filter element itself may be virtually any shape and may be a substantially planar member, for example, as long as a barrier is formed between the clean air chamber and the contaminant side or chamber. Referring to FIGS. 7 and 8, for example, there is illustrated a filter unit 110 having a housing 112 forming a flow chamber 114 and a transverse endwall 116 partially defining the chamber. Dust laden air is admitted to the chamber 114 through an inlet conduit 115. A substantially elongated oval tubular or perimeter type filter element 120 is suitably mounted in the housing 112 and is supported therein in a manner similar to the way in which the filter element 32 is supported. The filter element 120 defines, in part, a clean air discharge flow chamber which is formed by a plurality of chambers 129 and 131 through which filtered air flows into and through an elongated oval flow tube 124 into a chamber 126. The chamber 126 is defined in part by a housing 128 similar to the housing 24. Filtered air is discharged from the chamber 126 through a suitable conduit 130.

The filter unit 110 is provided with a reverse jet cleaning air discharge manifold 132 suitably mounted on a support tube 133 which extends centrally through the flow tube 124 and is supported by one of a plurality of partitions 127 extending through the flow tube and dividing the flow tube into the chambers 129 and 131. The manifold 132 is spaced from the end of the tube 124 and is directly in line with the flow path of air passing through the flow tube. A plurality of jet nozzles or orifices 134 are formed in a bottom wall 136 of the discharge manifold 132 to form overlapping conical air jets 138 which may be periodically created by discharging pressure air into the discharge manifold 132 through a quick opening valve 139 in communication with the head by way of a conduit 141 and with a pressure air supply manifold or conduit 140. The manifold 132 is also positioned with respect to the flow tube 124 and the partitions 127 so that the diverging jets 138 contact the sidewalls of the flow tube and the partitions just downstream of the juncture of the flow tube with the filter element 120 whereby a substantial "seal" is formed during the existence of the jets to prevent leakage of pressure air between the jets and the sidewalls of the flow tube. As with the embodiment described hereinabove in conjunction with FIGS. 1 through 6, the formation of the multiple jets 138 increases the surface area of the jet boundary formed between the fast moving air flow stream and the relatively stationary ambient air mass around the jets. This provides for substantial entrainment of ambient air with the jets 138 to provide a thorough flushing or flooding of the filter element 120 during the reverse jet cleaning process.

As with the configuration of the heads or manifolds 74, the manifold 132 is also configured to provide the jet nozzle pattern required for a completely enveloping reverse flow stream that will result in a very efficient and thorough flushing of the filter element 120. The valve 139 is also adapted to be opened and closed by a suitable control circuit, not shown, having a timing or a filter pressure differential sensitive device therein for periodically opening and closing the valve.

Although two specific embodiments of the present invention have been described herein in detail those skilled in the art will appreciate that the configuration of the filter element may vary greatly thanks to the inventive concept of the reverse flow cleaning system which is not limited to the provision of a generally cylindrical tubular type filter element of conventional design. Those skilled in the art will recognize various other substitutions and modifications which may be made to the present invention without departing from the scope and spirit thereof as recited in the appended claims.

What I claim is:

1. A porous media barrier type air filter unit, said filter unit including:
   a housing forming a filter chamber and including means for conducting dust laden air into said filter chamber and means for conducting filtered air from said housing;
   a filter element disposed in said filter chamber;
   means for supporting said filter element in said filter chamber, said filter element being constructed and arranged so as to define at least in part a clean air chamber for receiving air being filtered and which has flowed through said filter element;
   means forming a flow tube opening into said clean air chamber for conducting air which has been filtered from said clean air chamber and away from said filter element;
   a divider structure disposed in said clean air chamber and including means for partitioning said clean air chamber into a plurality of separate subchambers; and
   reverse flow air jet nozzle means comprising a plurality of separate orifices arranged in a predetermined pattern for discharging a shaped jet of pressure air for contact with substantially the entire periphery of the walls of said flow tube and for inducting a relatively large volume of substantially ambient pressure air into said flow tube in a direction opposite to the normal direction of flow of air which has been filtered out of said clean air chamber to backflush said filter element with a quantity of combined induced and jetted pressure air, said nozzle means being arranged in such a way so as to generate a jet having a cross sectional shape conforming to the cross sectional shape of said subchambers, respectively.

2. The filter unit set forth in claim 1 wherein:
   said divider structure includes at least three radially projecting partitions for forming at least three separate subchambers of said clean air chamber, and said nozzle means includes at least three cleaning air discharge manifolds, said separate orifices comprising a plurality of orifices in each of said at least three discharge manifolds opening toward said flow tube and arranged to provide a plurality of overlapping air jets for generating a flow of cleaning air in said flow tube to backflush segments of said filter element in a predetermined sequence.

3. The filter unit set forth in claim 2 wherein:
   said at least three discharge manifolds are each in communication with a cleaning air supply manifold by way of conduit means and pilot operated valve means in said conduit means for supplying pressure air to said at least three discharge manifolds.

4. The filter unit set forth in claim 3 wherein:
   said supply manifold comprises an annular housing mounted on a support plate and disposed around said flow tube.

5. The filter unit set forth in claim 4 wherein:
   said at least three discharge manifolds are supported on said supply manifold by said conduit means.

6. The filter unit set forth in claim 1 wherein:
   said divider structure extends into said flow tube.

7. A porous media barrier type air filter unit, said filter unit including:
   a housing forming a filter chamber and including means for conducting dust laden air into said filter chamber and means for conducting filtered air from said housing;
   a filter element disposed in said filter chamber;
   means for supporting said filter element in said filter chamber, said filter element being constructed and arranged so as to define at least in part a clean air chamber for receiving air being filtered and which has flowed through said filter element;
   a divider structure disposed in said clean air chamber and including means for partitioning said clean air chamber into a plurality of separate subchambers; and
   reverse flow air jet nozzle means comprising a plurality of orifices arranged in a predetermined pattern for discharging a shaped jet of pressure air for inducting a relatively large volume of substantially ambient pressure air to flow in a direction opposite to the normal direction of flow of air which has been filtered out of said clean air chamber to backflush said filter element with a quantity of combined induced and jetted pressure air, said nozzle means being arranged in such a way so as to generate a plurality of jets each having a cross sectional shape conforming substantially to the cross sectional shape of said subchambers, respectively.

8. A porous media barrier type air filter unit, said filter unit including:
   a housing forming a filter chamber and including means for conducting dust laden air into said filter chamber and means for conducting clean air out of said housing;

a porous media filter element disposed in said filter chamber;

means for supporting said filter element in said filter chamber, said filter element being constructed and arranged so as to define in part a clean air chamber having a noncircular cross sectional shape for receiving air being filtered and which has flowed through said filter element; and reverse flow air jet nozzle means including at least one pressure air manifold having a plurality of orifices formed in a wall of said manifold in a predetermined pattern so as to form overlapping frusto-conical air jets which are operable to expand in such a way as to have a cross sectional shape conforming substantially to the cross sectional shape of said clean air chamber for inducting a relatively large volume of substantially ambient pressure air to flow in a direction opposite to the direction of flow of air which has been filtered out of said clean air chamber to backflush at least a portion of said filter element.

9. The filter unit set forth in claim 8 including:

a divider structure disposed in said clean air chamber and including means for partitioning said clean air chamber into a plurality of separate subchambers, and said orifices are arranged in such a way to generate a jet having a cross-sectional shape conforming substantially to the cross-sectional shape of said subchambers, respectively.

10. A porous media barrier type air filter unit, said filter unit including:

a housing defining a filter chamber, means for admitting dust laden air to said filter chamber, said housing including support means for supporting a porous media filter element for filtering a quantity of dust laden air flowing through said housing and means for conducting clean air out of said housing;

a porous media filter element supported by said support means in said housing, said filter element being constructed and arranged so as to define at least in part a clean air chamber for receiving air being filtered and which has flowed through said filter element; and reverse flow air jet nozzle means having a plurality of orifices arranged in such a way as to form a plurality of freely expanding generally conical air jets which overlap to collectively form a stream of relatively high velocity air flowing in a direction opposite to the normal direction of flow of air which has been filtered through said clean air chamber and over substantially the entire cross sectional area of said clean air chamber for backflushing said filter element.

11. The filter unit set forth in claim 10 wherein:

said nozzle means comprises a manifold forming a chamber for containing a quantity of high pressure air, a wall of said manifold having said plurality of orifices formed therein and arranged in a predetermined pattern to form said overlapping jets so that said jets expand freely from said orifices toward said clean air chamber.

12. The filter unit set forth in claim 11 wherein:

said filter unit includes a flow tube having an end forming a junction with said clean air chamber, said flow tube defining a flow area not significantly less than the cross sectional flow area of said clean air chamber and arranged such that said plurality of jets expand into contact with said flow tube to form a seal around the periphery of said flow tube at said junction.

13. A porous media barrier type air filter unit, said filter unit including:

a housing forming a filter chamber and including means for conducting dust laden air into said filter chamber and means for conducting clean air out of said housing;

a porous media filter element disposed in said filter chamber;

means for supporting said filter element in said filter chamber, said filter element being constructed and arranged so as to define at least in part a clean air chamber for receiving air being filtered and which has flowed through said filter element;

means forming a flow tube forming an outlet for clean air flowing out of said clean air chamber, said flow tube having a cross sectional flow area not significantly less than the cross sectional flow area of said clean air chamber; and reverse flow air jet nozzle means including a plurality of orifices arranged in a predetermined pattern so as to form overlapping air jets which expand to form a flow stream having a cross sectional shape corresponding substantially to the cross sectional flow area of said flow tube so as to provide a flow stream of pressure air extending substantially entirely across said clean air chamber for backflushing said filter element to remove accumulations of particulate material thereon by flooding a major portion of the media of said filter element with said pressure air.

14. A porous media barrier type air filter unit, said filter unit including:

a housing forming a filter chamber and including means for conducting dust laden air into said filter chamber and means for conducting filtered air from said housing;

a generally cylindrical pleated paper filter element disposed in said filter chamber;

means for supporting said filter element in said filter chamber, said filter element being constructed and arranged so as to define at least in part a clean air chamber having a generally circular cross sectional shape for receiving air being filtered and which has flowed through said filter element; and reverse flow air jet nozzle means comprising a plurality of orifices arranged in a predetermined pattern for generating overlapping jets of pressure air which expand to have a collective cross sectional shape conforming substantially to the cross sectional shape of said clean air chamber for inducting a relatively large volume of substantially ambient pressure air to flow in a direction opposite to the normal direction of flow of air which has been filtered out of said clean air chamber to backflush said filter element with a quantity of combined induced and jetted pressure air.

15. A porous media barrier type air filter unit, said filter unit including:

a housing including means for conducting dust laden air into said housing and means for conducting filtered air from said housing;

a filter element disposed in said housing and forming a porous media barrier for collecting particulate material impinging on said filter element;

means for supporting said filter element in said housing, said filter element being constructed and arranged so as to define at least in part a clean air chamber for receiving air being filtered and which has flowed through said filter element; and reverse flow air jet nozzle means comprising a plurality of orifices arranged in a predetermined pattern for generating a jet of pressure air which expands to have a cross sectional shape conforming substantially to the cross sectional shape of said clean air chamber for inducting a relatively large volume of substantially ambient pressure air to flow in a direction opposite to the normal direction of flow of air which has been filtered out of said clean air chamber to backflush said filter element with a quantity of combined induced and jetted pressure air of such magnitude that particulate material impinged on said porous media barrier may be dislodged with force sufficient such that said filter element may be operated at a flow rate of air to be filtered to filter surface area of at least about 4.0 to 5.0 cubic feet of air per minute per square foot of filter element surface area.

16. A porous media barrier type air filter unit, said filter unit including:

a housing including means for admitting dust laden air to said housing and means for conducting clean air out of said housing;

a porous media filter element disposed in said housing;

means for supporting said filter element in said housing, said filter element being constructed and arranged so as to define in part a clean air chamber for receiving air which has flowed through said filter element;

reverse flow air jet nozzle means including a plurality of orifices arranged in a predetermined pattern so as to form overlapping air jets which expand to form a flowstream having a cross sectional shape corresponding substantially to the cross sectional shape of said clean air chamber and provide a stream of pressure air substantially entirely across said clean air chamber for backflushing said filter element to remove accumulations of particulate material thereon by flooding the media of said filter element with said pressure air; and means defining an outlet from said clean air chamber and having a cross sectional flow area not significantly less than the cross sectional flow area of said clean air chamber so as to minimize flow restriction of filtered air out of said clean air chamber and arranged such that said plurality of jets expand toward said means defining said outlet to form a seal around the periphery of said means defining said outlet between one end of said means defining said outlet and said clean air chamber.

17. A porous media barrier type air filter unit, said filter unit including:

a housing including means for conducting dust laden air into said housing and means for conducting filtered air from said housing;

a porous media filter element supported in said housing, said filter element being constructed and arranged so as to define at least in part a clean air chamber for receiving air which has flowed through said filter element;

a divider structure disposed in said clean air chamber and including means for partitioning said clean air chamber into a plurality of separate subchambers;

reverse flow air jet nozzle means comprising a plurality of orifices arranged in a predetermined pattern for discharging plural jets of pressure air to flow in a direction opposite to the normal direction of flow of air which has been filtered out of said clean air chamber to backflush said filter element, said nozzle means being arranged in such a way so as to generate plural sets of overlapping jets which flow into said subchambers, respectively, each of said sets of overlapping jets forming a flowstream of air having a cross sectional shape conforming substantially to the cross sectional shape of said subchambers, respectively.

* * * * *